US010909221B2

(12) United States Patent
Zhang et al.

(10) Patent No.: US 10,909,221 B2
(45) Date of Patent: Feb. 2, 2021

(54) CONTAINER LICENSE MANAGEMENT METHOD, AND APPARATUS

(71) Applicant: Huawei Technologies Co., Ltd., Shenzhen (CN)

(72) Inventors: Liang Zhang, Shenzhen (CN); Jianrui Yang, Shenzhen (CN); Xingshui Dong, Lagos (NG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 335 days.

(21) Appl. No.: 15/923,703

(22) Filed: Mar. 16, 2018

(65) Prior Publication Data

US 2018/0268115 A1  Sep. 20, 2018

(30) Foreign Application Priority Data

Mar. 17, 2017  (CN) .......................... 2017 1 0160521

(51) Int. Cl.
| | |
|---|---|
| *H04L 29/06* | (2006.01) |
| *G06F 21/10* | (2013.01) |
| *G06F 21/12* | (2013.01) |
| *G06F 8/61* | (2018.01) |
| *G06F 9/455* | (2018.01) |
| *G06F 9/445* | (2018.01) |

(52) U.S. Cl.
CPC .............. *G06F 21/105* (2013.01); *G06F 8/63* (2013.01); *G06F 9/455* (2013.01); *G06F 21/121* (2013.01); *G06F 9/445* (2013.01); *G06F 2221/0768* (2013.01)

(58) Field of Classification Search
CPC ........... G06F 9/455; G06F 8/63; G06F 21/105
See application file for complete search history.

(56) References Cited

U.S. PATENT DOCUMENTS

| | | | | |
|---|---|---|---|---|
| 9,063,815 B2* | 6/2015 | Kundu | ...................... | G06F 8/63 |
| 2009/0249329 A1* | 10/2009 | Dash | ......................... | G06F 8/61 |
| | | | | 718/1 |

(Continued)

FOREIGN PATENT DOCUMENTS

| | | |
|---|---|---|
| EP | 2413238 A1 | 2/2012 |
| WO | 2016089484 A1 | 6/2016 |

OTHER PUBLICATIONS

Foreign Communication From a Counterpart Application, European Application No. 18161147.6, Extended European Search Report dated Aug. 8, 2018, 8 pages.

*Primary Examiner* — Shin-Hon (Eric) Chen
(74) *Attorney, Agent, or Firm* — Conley Rose. P.C.

(57) ABSTRACT

A container license management method and an apparatus, where the method includes receiving an image download request including information for requesting a license from a container management background, obtaining an image according to the image download request, obtaining the information for requesting a license in the image download request, generating a license image layer corresponding to the information for requesting a license, adding the license image layer to the obtained image, and sending, to the container management background, the image to which the license image layer is added such that the container management background starts a container corresponding to the image, and detects whether the license image layer is valid. Hence, container license management efficiency can be improved.

18 Claims, 7 Drawing Sheets

(56) References Cited

U.S. PATENT DOCUMENTS

| | | | |
|---|---|---|---|
| 2012/0240110 A1* | 9/2012 | Breitgand | G06F 9/45558 718/1 |
| 2012/0266170 A1* | 10/2012 | Zimmerman | G06F 9/45558 718/1 |
| 2012/0317039 A1* | 12/2012 | Kaplinger | G06F 21/10 705/310 |
| 2014/0096133 A1* | 4/2014 | Kundu | G06F 9/455 718/1 |
| 2015/0020069 A1* | 1/2015 | Patani | G06F 9/45558 718/1 |

* cited by examiner

CONTAINER LICENSE MANAGEMENT METHOD, AND APPARATUS

CROSS-REFERENCE TO RELATED APPLICATION

This application claims priority to Chinese Patent Application No. 201710160521.7, filed on Mar. 17, 2017, which is hereby incorporated by reference in its entirety.

TECHNICAL FIELD

The present disclosure relates to the field of computer technologies, and in particular, to a container license management method and an apparatus.

BACKGROUND

In the field of computer technologies, network functions virtualization (NFV) may use a standard universal device to implement a network function based on virtualization software such that the network function is no longer limited to a hardware architecture. Therefore, different application programs can run on an undiversified hardware platform, energy consumption can be reduced, and memory use efficiency can be improved. A container virtualization technology is an application of the NFV, and can provide isolated running space for an application program such that operating system overheads can be reduced, and resource utilization can be improved. Currently, a license may be used to perform management and function limitation on a container.

However, existing container license configuration is performed at a container service level, and different services have different license allocation and management. In addition, there is usually a large quantity of containers corresponding to different services, and license maintenance cannot be performed centrally. Consequently, a container license management workload is excessively large, and an operation and maintenance are complex, causing low container license management efficiency.

SUMMARY

Embodiments of the present disclosure disclose a container license management method and an apparatus such that container license management efficiency can be improved.

According to a first aspect, an embodiment of the present disclosure provides a container license management method, including receiving an image download request that includes information for requesting a license and that is sent by a container management background, obtaining an image according to the image download request, obtaining the information for requesting a license that is in the image download request, generating a license image layer corresponding to the information for requesting a license, adding the license image layer to the obtained image, and sending, to the container management background, the image to which the license image layer is added such that the container management background starts a container corresponding to the image, and detects whether the license image layer is valid. It can be learned that license configuration is performed during container creation such that license configuration and container creation are performed on one node, and the following problem, where when license allocation is performed at a service level, there is a large quantity of containers, and license maintenance cannot be performed centrally is avoided. Therefore, container license management efficiency can be improved.

According to a second aspect, an embodiment of the present disclosure provides a container license management method, including receiving a container creation request, sending an image download request corresponding to the container creation request to an image repository, where the image download request includes information for requesting a license such that the image repository obtains an image corresponding to the image download request, obtains the information for requesting a license that is in the image download request, generates a license image layer corresponding to the information for requesting a license, and adds the license image layer to the image, receiving the image to which the license image layer is added and that is sent by the image repository, starting a container corresponding to the image, detecting whether the license image layer is valid, and running the container when the license image layer is valid. It can be learned that license configuration is requested from a container management background while container creation is requested such that license configuration and container creation are simultaneously performed on the container management background, and the following problem, where when license allocation is performed at a service level, there is a large quantity of containers, and license maintenance cannot be performed centrally is avoided. Therefore, container license management efficiency can be improved. Validity of an image layer is detected such that a risk of container theft is avoided, and container use security is improved.

According to a third aspect, an embodiment of the present disclosure provides an image repository, where the image repository includes a module configured to execute the container license management method according to the first aspect or any one of possible implementations of the first aspect.

According to a fourth aspect, an embodiment of the present disclosure provides a container management background, where the container management background includes a module configured to execute the container license management method according to the second aspect or any one of possible implementations of the second aspect.

According to a fifth aspect, an embodiment of the present disclosure provides a computer readable storage medium, including an instruction, and when running on a computer, the instruction enables the computer to execute the container license management method according to the first aspect or any one of possible implementations of the first aspect.

According to a sixth aspect, an embodiment of the present disclosure provides a computer readable storage medium, including an instruction, and when running on a computer, the instruction enables the computer to execute the container license management method according to the second aspect or any one of possible implementations of the second aspect.

BRIEF DESCRIPTION OF DRAWINGS

To describe the technical solutions in the embodiments of the present disclosure more clearly, the following briefly describes the accompanying drawings required for describing the embodiments of the present disclosure.

DESCRIPTION OF EMBODIMENTS

The embodiments of the present disclosure disclose a container license management method and an apparatus in order to improve container license management efficiency. Details are separately described in the following.

Figure 1:
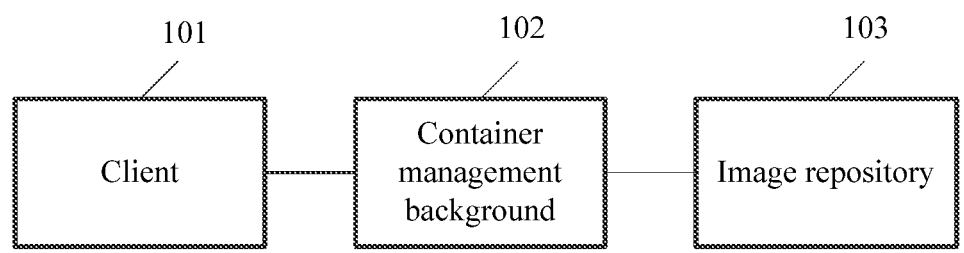
FIG. 1 illustrates an architecture diagram of a system for deploying a container according to an embodiment of the present disclosure.

To make the embodiments of the present disclosure more understandable, an architecture of a system used in the embodiments of the present disclosure is first described in the following. Referring to FIG. 1, FIG. 1 illustrates an architecture diagram of a system according to an embodiment of the present disclosure. As shown in FIG. 1, the system may include a client 101, a container management background 102, and an image repository 103. The client 101 establishes communication with the container management background 102, and the container management background 102 may run on a host. The client 101 and the container management background 102 may run on one host, or may run on different hosts, and may perform communication using a socket or a representational state transfer (RESTful) application programming interface (API). For a user, the system is an architecture in a client/server (C/S) model. The image repository 103 is configured to store a container image, and the container image is a file that is loaded to initialize a file architecture and directory of a container during container creation. The container management background 102 may communicate with the image repository 103 to obtain an image in the image repository 103. A DOCKER container is used as an example. In a DOCKER container scenario, a DOCKER client is a client, in a DOCKER architecture, that is used by a user to establish communication with a DOCKER daemon. An executable file used by the user is DOCKER command-line tool, and the DOCKER client may initiate a plurality of container management requests to the DOCKER daemon using the DOCKER command-line tool. In the DOCKER architecture, the DOCKER daemon may be a system process that constantly runs in a background of a host, and receives and processes the request sent by the DOCKER client. In a DOCKER running process, the DOCKER daemon communicates with a DOCKER registry to implement three functions, image searching, image downloading, and image uploading. Work process names corresponding to the three functions are "search," "pull," and "push." In the DOCKER architecture, the DOCKER daemon may use a public DOCKER registry, that is, DOCKER hub. When obtaining a container image from the DOCKER hub, the DOCKER daemon needs to access the DOCKER hub using an Internet, and the DOCKER daemon allows the user to construct a local private registry. In this way, it can be ensured that the container image is obtained in the local private registry.

In addition, the system may further include a management control node (not shown). The management control node is a container management system, constructs a container scheduling service on a basis of the DOCKER, and provides a resource scheduling function. An existing management control node includes cloud management control platforms such as an OPENSTACK cloud management platform, GOOGLE's KUBERNETES, and DOCKER swarm, but is not limited thereto.

Figure 2:
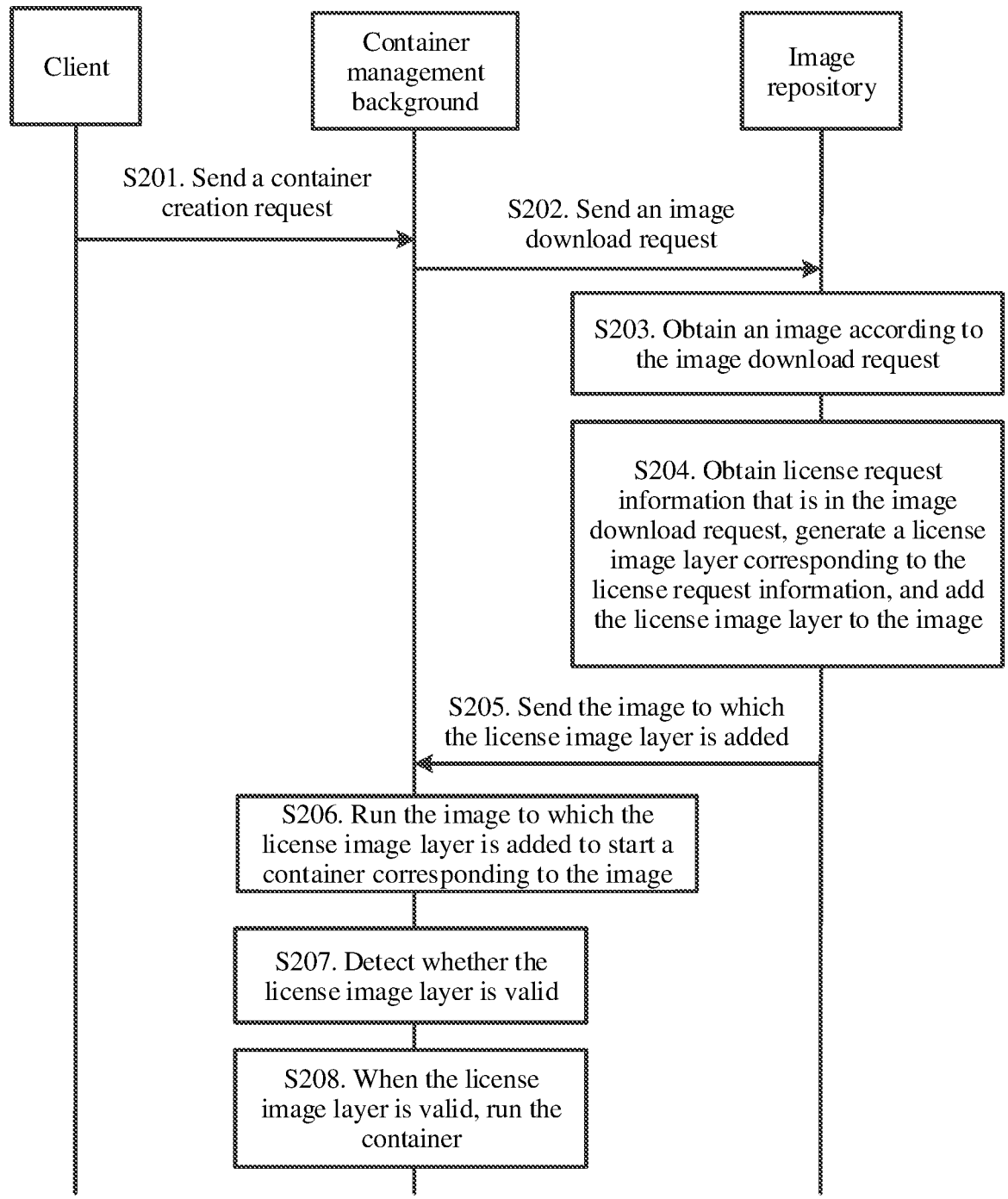
FIG. 2 illustrates a schematic flowchart of a container license management method according to an embodiment of the present disclosure.

Based on the system shown in FIG. 1, an embodiment of the present disclosure discloses a container license management method. The license management method is described from perspectives of the client 101, the container management background 102, and the image repository 103. As shown in FIG. 2, the license management method may include but is not limited to the following steps.

Step S201: A client sends a container creation request to a container management background.

The container management background provides a server-side function such that the container management background can receive the request of the client. The container creation request may be a container creation request sent by the client using a remote API. A user may establish communication with the container management background using the client to initiate a container management request. The container management request may include container creation, container migration, container running, and the like. The container management background runs in a background of a container host. In a DOCKER container scenario, the container management background is a DOCKER deamon. The container creation request may be a request that is sent by the client to the container management background when the client receives a "run" command and that is used for container creation. The request carries information about a designated image that needs to be downloaded, and the information is used by the container management background to determine an image corresponding to an image download request.

Step S202: The container management background sends an image download request to an image repository.

After receiving the container creation request, the container management background may provide the server-side function to provide a service for the container creation request and send the image download request to the image repository. The image download request may include an image parameter that is used to find a designated image. The image repository may be a public image repository or a private image repository. The image download request includes information for requesting a license. A license may be used to implement validity management and verification in a related container operation to manage and control a container function, and is generated and sent in the image repository in a form of a license image layer. The information for requesting a license may include tenant information. The tenant information is information about a user/tenant that uses a container. The tenant information may be included in the container management request sent by the client. The tenant information may include at least one of tenant identification information, a tenant name, a container function request list, or container license licensing time information, or may include other information obtained by means of extension by a container vendor according to a requirement of the vendor. The container function request list and the container license licensing time may be used as license files. The container function request list is a list for limiting a function used when the container runs, and a container function in the list is a function that can be implemented by the container and that the tenant of the container requests the image repository to grant, for example, the function may include a firewall function or a routing function. The time information may include time of obtaining the information for requesting a license. The time may be standard time, or may be local time of the image repository. The time information may also include a use period of a license image layer.

Step S203: The image repository obtains an image according to the image download request.

The image download request may be a hypertext transfer protocol (HTTP) request sent by the container management background to the image repository using a RESTful API. After receiving the HTTP request, the image repository extracts an image parameter in the HTTP request, and obtains, according to the image parameter and an image layer organization structure of the image repository, an image corresponding to the HTTP request.

Step S204: The image repository obtains information for requesting a license that is in the image download request, generates a license image layer corresponding to the information for requesting a license, and adds the license image layer to the obtained image.

In this embodiment, that the image repository generates a license image layer corresponding to the information for requesting a license may include performing validity verification on the information for requesting a license, and generating the corresponding license image layer according to the information for requesting a license when the validity verification on the information for requesting a license succeeds.

The information for requesting a license includes tenant information, and the tenant information includes a container function request list. Whether the container function request list is allowed may be detected according to a container function list preset in the image repository. When the container function list includes the container function request list, it indicates that the validity verification succeeds, and the step of generating the license image layer is performed. The container function list preset in the image repository is used by the container vendor to manage and control a function of a container produced by the vendor, that is, the container vendor includes, into the container function list, a function that the container produced by the vendor can implement. For example, if a container vendor wants a produced container to be used to implement only a virtual firewall function, a virtual routing device function, a database function, and the like, the container vendor may write these functions into a container function list, and sends the container function list to the image repository in advance for storage. During container creation, when a container function request list in tenant information included in an image download request includes a virtual firewall function and a virtual routing device function, the image repository may detect whether each container function in the container function request list is included in the container function list preset in the image repository. When each container function is included in the container function list preset in the image repository, it indicates that the container vendor allows the container function request list, and it indicates that validity verification on information for requesting a license succeeds, that is, the information for requesting a license is valid, and a license image layer corresponding to the license request information for requesting a license may be generated. When a container function request list in tenant information included in another image download request includes a virtual firewall function and a virtual switch function, because the virtual switch function in the container function request list does not fall within the container function list preset the image repository, it indicates that validity verification on information for requesting a license fails, that is, the information for requesting a license is invalid, and a procedure is terminated.

The information for requesting a license may further include a hardware information list. The tenant information and the hardware information list may be encrypted using a local private key to generate the license image layer. The license image layer includes the tenant information, the hardware information list, and encryption information generated using the local private key.

In this embodiment, the local private key may be a private key generated by the image repository, or may be a vendor private key of the container vendor. Hardware information in the hardware information list is information corresponding to hardware in which the vendor allows a container produced by the vendor to be deployed. The hardware information list is a set of information of hardware that is on a host and in which a container is allowed to be deployed. An element in the hardware information may include, for example, at least one of an electronic serial number (ESN), central processing unit identification (CPUID) information, a network interface card physical address, a basic input/output system (BIOS), a storage, an input/output port, or the like, or may include dedicated hardware information read on the host of the container management background. The dedicated hardware information may be obtained from the container management background, and when a container is started, may be transferred to an application program inside the container for verification.

The license image layer is a read-only layer generated by the image repository. The image repository combines the read-only layer and the obtained image, and integrates different layers into one file system using a union file system technology in the image repository, to provide container initialization during container creation.

In this embodiment, step S203 and step S204 may be performed at the same time, or may be performed in sequence, and a sequence is not limited.

Step S205: The image repository sends, to the container management background, the image to which the license image layer is added.

The image to which the license image layer is added may be sent from image repository to the container management background using the RESTful API.

Step S206: The container management background runs the image to which the license image layer is added to start a container corresponding to the image.

Further, when receiving the image to which the license image layer is added, the container management background runs the image to which the license image layer is added to start the container corresponding to the image, that is to create a container, and complete a container start operation in a run operation. The container start operation is a create operation in the run operation in a DOCKER container. A function of the run operation is to run a service command inside a new DOCKER container. When executing the run operation, work of the DOCKER deamon may be divided into two parts, a create operation of creating a root file system required by the DOCKER container, and a start operation of creating a network running environment of a container and processing a service request sent by a user. The service request may be included in a parameter of the run operation. In the DOCKER deamon, starting the container corresponding to the image is creating the root file system required by the DOCKER container. That is, the image to which the license image layer is added is run such that a readable layer is added to the image, and a new container is created, but the new container is not run, that is, a service is not executed.

Step S207: The container management background detects whether the license image layer is valid.

The container management background detecting whether the license image layer is valid may include the following steps. The container management background decrypts the license image layer using a pre-stored local public key, where the local public key is a public key corresponding to the local private key, obtains the hardware information list from the decrypted license image layer using local private key, obtains local-hardware information of the container from the started container, detects whether the hardware information list includes the local-hardware information, where an element included in the local-hardware information corresponds to that in the hardware information list, and may include at least one of an ESN, CPUID, a network interface card physical address, a BIOS, a storage, an input/output port, or the like. When the hardware information list includes the local-hardware information, that is, when the local-hardware information may be found in the hardware information list allowed by the vendor and an identity of local hardware may be determined, it indicates that the license image layer is valid, and step S208 is performed. Whether local-hardware information is included in a preset hardware information list is detected, to determine validity of a license image layer such that the following problem, where a container image is maliciously stolen by hardware that is not in the hardware information list, and a container function is illegally used is avoided. Therefore, container use security can be improved.

Further, for the pre-stored local public key, if the local private key used by the image repository to generate the image layer is a vendor private key, a vendor public key corresponding to the vendor private key is pre-stored in the container management background, and the vendor public key is used for decryption by the container management background. Correspondingly, if the local private key used by the image repository to generate the image layer is an image repository private key, a image repository public key corresponding to the image repository private key is pre-stored in the container management background, and the image repository public key is used for decryption by the container management background.

In this embodiment, that the container management background detects whether the license image layer is valid may include the following steps. The container management background creates a monitor process, a step of detecting whether the image includes the license image layer is performed in the create operation in the run operation in the monitor process, and when the image includes the license image layer, in the monitor process of the container management background, a step of decrypting the license image layer using the pre-stored local public key to obtain the hardware information list and the local-hardware information of the container is performed. When the image does not include the license image layer, or the hardware information list does not include the local-hardware information, a service execution process is terminated.

Step S208: When the license image layer is valid, the container management background runs the container.

Further, in the monitor process, when it is detected that the container includes the license image layer, the license image layer can be decrypted using the local public key, and the hardware information list obtained by means of decryption includes the local-hardware information, it indicates that the license image layer is valid, verification succeeds, and the container management background runs the container, that is, executes the start operation in the run operation, and processes the service request sent by the user.

In the container license management method described in FIG. 2, the container management background receives the container creation request, and sends, to the image repository, the image download request that includes the information for requesting a license. The image repository obtains the image according to the image download request, the image repository obtains the information for requesting a license that is in the image download request, the image repository generates the license image layer corresponding to the information for requesting a license, and the image repository adds the license image layer to the obtained image. The container management background receives the image to which the license image layer is added and that is sent by the image repository, the container management background starts the container corresponding to the image, the container management background detects whether the license image layer is valid, and when the license image layer is valid, the container management background runs the container. It can be learned that license configuration is performed during container creation such that license configuration and container creation are performed on one node, and the following problem, where when license allocation is performed at a service level, there is a large quantity of containers, and license maintenance cannot be performed centrally is avoided. Therefore, container license management efficiency can be improved.

Figure 3:
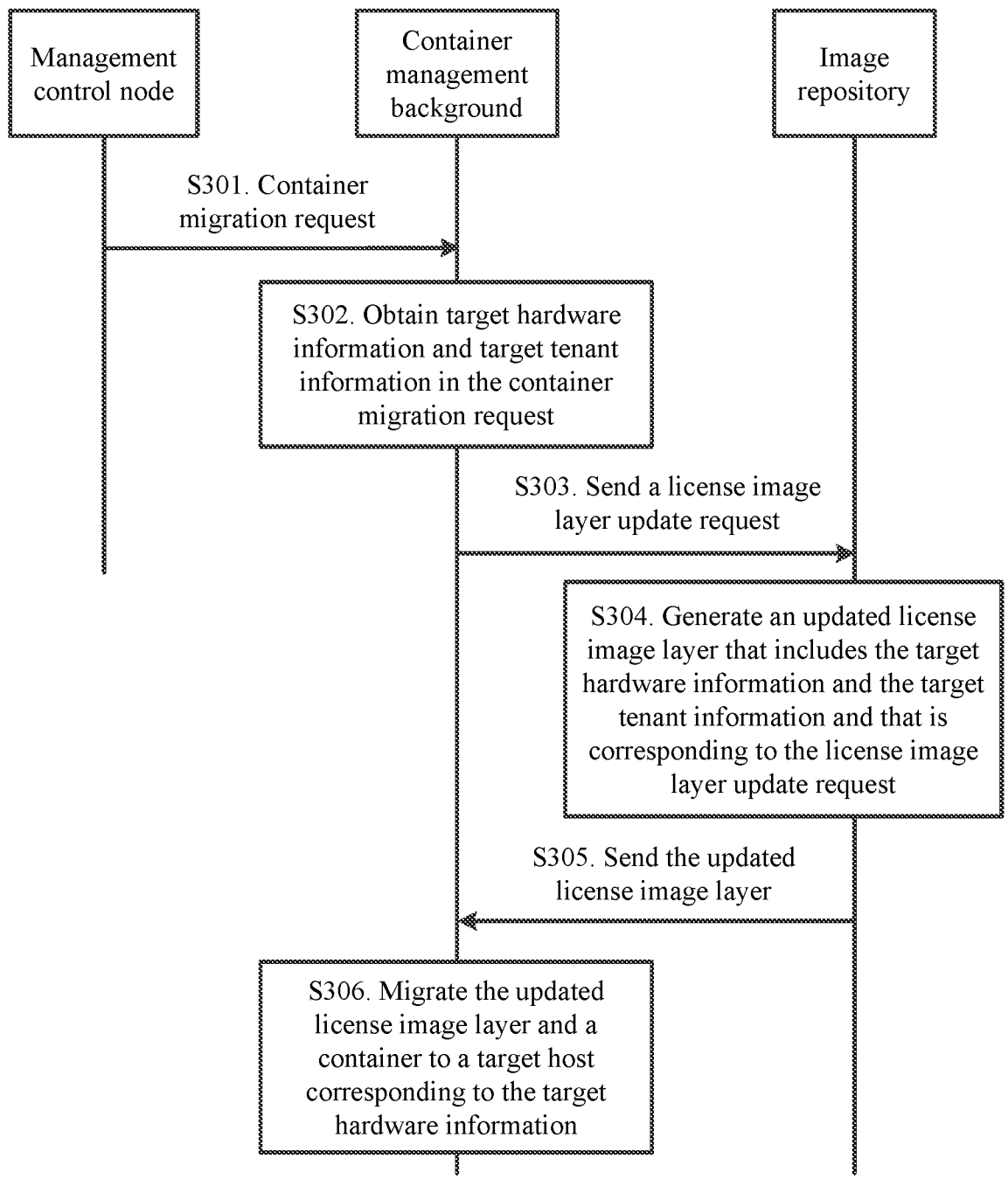
FIG. 3 illustrates a schematic flowchart of another container license management method according to an embodiment of the present disclosure.

Based on the system shown in FIG. 1, an embodiment of the present disclosure discloses another container license management method. The container license management method is described from perspectives of the container management background 102 and the image repository 103. As shown in FIG. 3, the container license management method may include steps S301 to S306.

Step S301: A container management background receives a container migration request sent by a management control node.

The container migration request includes target hardware information and target tenant information. The target hardware information and the target tenant information are hardware information of a new host existing after migration and tenant information of a migrated container. The target hardware information is hardware information of a target host to which the container is migrated, and may include at least one of an ESN, CPUID, a network interface card physical address, a BIOS, a storage, an input/output port, or the like of the target host. The target tenant information is user information of the migrated container after container migration is performed, and may include at least one of a target tenant identification, a target tenant name, an updated container function request list, updated container license licensing time information, or the like, or may include other information obtained by means of extension by a container vendor according to a requirement of the vendor. The updated container function request list and the updated container license licensing time may be used as updated license files. The updated container function request list is used to manage and control a function used when the container runs, for example, the function may include a firewall type or a routing device type. The time information may include time of obtaining information for requesting a license. The time may be standard time, or may be local time of an image repository. The time information may also include a use period of a license image layer.

The container migration request is a migration API request sent by the management control node to the container management background. The request includes information indicating a target container that needs to be migrated, and the information is used to determine the container that needs to be migrated. The container management background is a container management background existing before the container that needs to be migrated is migrated. The management control node simultaneously refreshes resource data corresponding to the target hardware information and the target tenant information. The resource data is a record kept by the management control node for all containers controlled by the management control node. Before container migration, the management control node records related information of container migration, and the information includes records of a host and a tenant that exist after the container that needs to be migrated is migrated, a tenant change record and a host change record, and the like such that the management control node manages and controls the migrated container. The target hardware information and the target tenant information that are included in the request may be periodically reported, to the management control node, by a container management background on a target host to which the container is migrated. The management control node generates a migration request according to the target hardware information and the target tenant information.

For example, if a container needs to be migrated from a host A to a host B, and tenant information of the container needs to change from a to b, the management control node needs to store a record used to indicate that the container is migrated to the host B, and a record indicating that the tenant information is b, and needs to store a migration record used to indicate that the container is migrated from A to B, and a replacement record indicating that b replaces a as the tenant information.

Step S302: The container management background obtains target hardware information and target tenant information in the container migration request.

Step S303: The container management background sends a license image layer update request to an image repository.

The license image layer update request includes the target hardware information and the target tenant information.

Step S304: The image repository generates an updated license image layer that includes the target hardware information and the target tenant information corresponding to the license image layer update request.

In this embodiment, the image repository may obtain the target hardware information and the target tenant information from the license image layer update request, and performs validity verification on the license image layer update request.

In this embodiment, the target tenant information includes an updated container function request list. The image repository may detect whether a preset container function list includes the updated container function request list, and when the container function list includes the updated container function request list, perform the step of generating, according to the license image layer update request, the updated license image layer that comprises the target hardware information and the target tenant information.

In this embodiment, when sending the migration request to the container management background existing before the container is migrated, the management control node may send a migration notification to a target container management background to which the container is migrated. The target container management background sends a notification message to the image repository according to the migration notification, to notify the image repository that the target container management background is ready to receive a migrated container. When receiving the notification message, the image repository generates the updated license image layer.

Step S305: The image repository sends the updated license image layer to the container management background.

The image repository simultaneously refreshes stored license management information. The license management information is a license image layer generation and sending record that is kept by the image repository, and the record may include a license image layer generation and sending record existing before migration, a license image layer generation and sending record existing after migration, migration records existing before and after migration, and the like.

Step S306: The container management background migrates the updated license image layer and a container to a target host corresponding to the target hardware information.

Further, because an image has a read-only feature and an overlaying feature, an original license image layer does not need to be deleted, and the updated license image layer only needs to be overlaid on the original license image layer for migration together. Because the container has a feature of overlaying file systems, the updated license image layer is valid in the target host by replacing the original license image layer, and the original license image layer is invalid. Then, the container management background on the target host runs the container.

In the container license management method described in FIG. 3, the container management background receives the container migration request sent by the management control node. The container management background obtains the target hardware information and the target tenant information in the migration request, and the container management background sends the license image layer update request to the image repository. The image repository generates the updated license image layer that includes the target hardware information and the target tenant information corresponding to the license image layer update request. The image repository sends the updated license image layer to the container management background. The container management background migrates the updated license image layer and the container to the target host corresponding to the target hardware information. It can be learned that before a container is migrated, an updated license image layer is generated according to hardware information of a target host to which the container is migrated and tenant information, and the updated license image layer and the container are migrated together such that license image layer update is implemented during container migration, and container license management efficiency can be improved.

Figure 4:
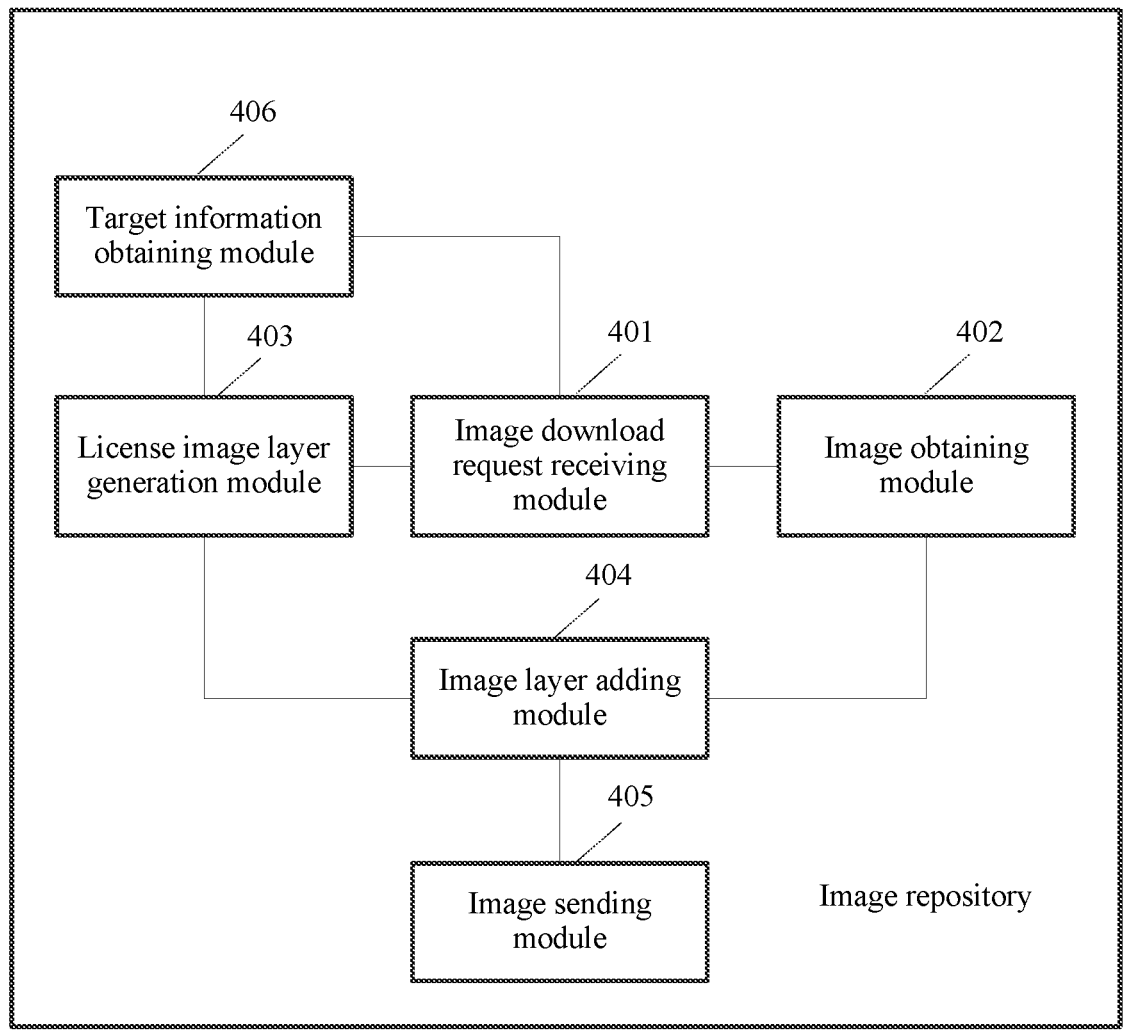
FIG. 4 illustrates a schematic structural diagram of an image repository according to an embodiment of the present disclosure.

Based on a network architecture shown in FIG. 1, referring to FIG. 4, FIG. 4 illustrates a schematic structural diagram of an image repository according to an embodiment of the present disclosure. As shown in FIG. 4, the image repository may include an image download request receiving module 401 configured to receive an image download request that includes information for requesting a license and that is sent by a container management background, an image obtaining module 402 configured to obtain an image according to the image download request, a license image layer generation module 403 configured to obtain the information for requesting a license that is in the image download request, and generate a license image layer corresponding to the information for requesting a license, an image layer adding module 404 configured to add the license image layer to the image, and an image sending module 405 configured to send, to the container management background, the image to which the license image layer is added such that the container management background starts a container corresponding to the image, and detects whether the license image layer is valid.

In a possible implementation, the license image layer generation module 403 is further configured to perform validity verification on the information for requesting a license, and when the validity verification on the information for requesting a license succeeds, generate the corresponding license image layer according to the information for requesting a license.

In a possible implementation, the information for requesting a license includes tenant information, the tenant information includes a container function request list, and the license image layer generation module 403 is further configured to detect whether a preset container function list includes the container function request list, and perform the step of generating the corresponding license image layer according to the information for requesting a license when the container function list includes the container function request list.

In a possible implementation, the information for requesting a license further includes a hardware information list, and the license image layer generation module 403 is further configured to encrypt the tenant information and the hardware information list using a local private key to generate the license image layer, where the license image layer includes the tenant information, the hardware information list, and encryption information generated using the local private key.

In a possible implementation, the image download request receiving module 401 is further configured to receive a license image layer update request that includes target hardware information and target tenant information and that is sent by the container management background.

As shown in FIG. 4, the image repository further includes a target information obtaining module 406 configured to obtain the target hardware information and the target tenant information in the license image layer update request.

The license image layer generation module 403 is further configured to generate an updated license image layer that includes the target hardware information and the target tenant information corresponding to the license image layer update request.

The image sending module 405 is further configured to send the updated license image layer to the container management background such that the container management background obtains the target hardware information, and migrates the updated license image layer and the container according to the target hardware information.

In a possible implementation, the license image layer generation module 403 is further configured to perform validity verification on the license image layer update request, and when the validity verification succeeds, generate, according to the license image layer update request, the updated license image layer that includes target hardware information and the target tenant information.

In a possible implementation, the license image layer generation module 403 is further configured to detect whether the preset container function list includes the updated container function request list, and perform the step of generating, according to the license image layer update request, the updated license image layer that comprises the target hardware information and the target tenant information when the container function list includes the updated container function request list.

Figure 5:
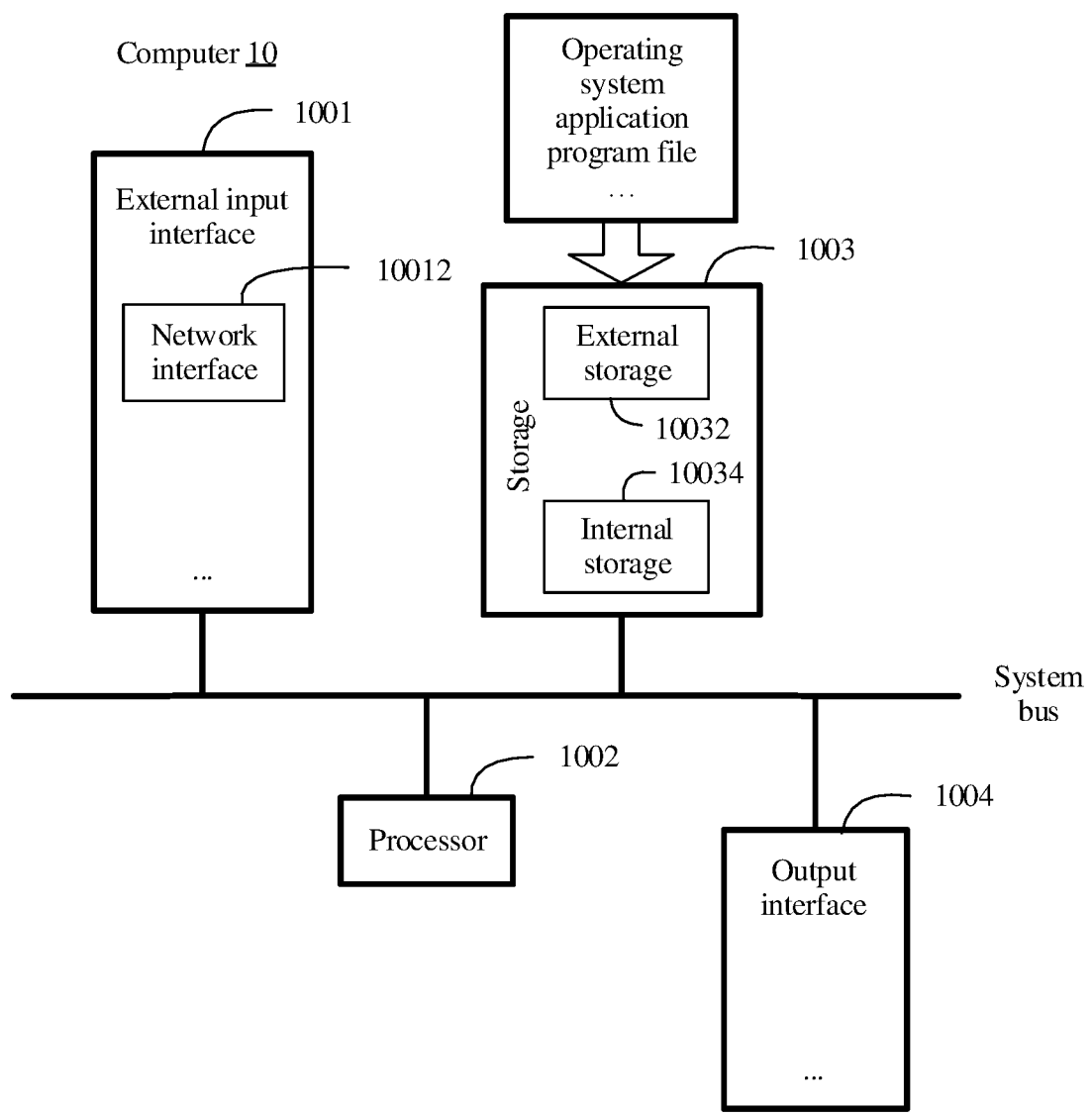
FIG. 5 illustrates a computer that runs a container license management method according to an embodiment of the present disclosure.

Based on a network architecture shown in FIG. 1, referring to FIG. 5, FIG. 5 illustrates a computer 10 that runs the foregoing container license management method according to an embodiment of the present disclosure. As shown in FIG. 5, the computer 10 may include an external input interface 1001, a processor 1002, a storage 1003, and an output interface 1004 that are connected using a system bus. Optionally, the external input interface 1001 may include at least a network interface 10012. The storage 1003 may include an external storage 10032 (such as a hard disk, an optical disc, or a FLOPPY DISK) and an internal storage 10034.

In this embodiment, the method is executed based on a computer program. A program file of the computer program (i.e., operating system application program file) is stored in the external storage 10032 of the computer 10, is loaded into the internal storage 10034 during running, and is compiled into machine code and then transmitted to the processor 1002 for execution such that the image download request receiving module 401, the image obtaining module 402, the license image layer generation module 403, the image layer adding module 404, and the image sending module 405 shown in FIG. 4 are logically formed on the computer 10. In addition, in a process of executing the foregoing container license management method, an input parameter is received using the external input interface 1001, is transmitted to the storage 1003 for temporarily storage, and then is input into the processor 1002 for processing. A result data of the processing is temporarily stored in the storage 1003 for subsequent processing, or is transmitted to the output interface 1004 for output.

Further, the processor 1002 is configured to perform the steps of receiving an image download request that includes information for requesting a license and that is sent by a container management background, obtaining an image according to the image download request, obtaining the information for requesting a license that is in the image download request, generating a license image layer corresponding to the information for requesting a license, adding the license image layer to the image, and sending, to the container management background, the image to which the license image layer is added such that the container management background starts a container corresponding to the image, and detects whether the license image layer is valid.

In an embodiment, the processor 1002 is further configured to perform validity verification on the information for requesting a license, and generate the corresponding license image layer according to the information for requesting a license when the validity verification on the information for requesting a license succeeds.

In an embodiment, the information for requesting a license includes tenant information, the tenant information includes a container function request list, and the processor 1002 is further configured to detect whether a preset container function list includes the container function request list, and perform the step of generating the corresponding license image layer according to the information for requesting a license when the container function list includes the container function request list.

In an embodiment, the information for requesting a license further includes a hardware information list, and the processor 1002 is further configured to encrypt the tenant information and the hardware information list using a local private key to generate the license image layer, where the license image layer includes the tenant information, the hardware information list, and encryption information generated using the local private key.

In an embodiment, the processor 1002 is further configured to receive a license image layer update request that includes target hardware information and target tenant information and that is sent by the container management background, obtain the target hardware information and the target tenant information in the license image layer update request, generate an updated license image layer that includes the target hardware information and the target tenant information corresponding to the license image layer update request, and send the updated license image layer to the container management background such that the container management background obtains the target hardware information, and migrates the updated license image layer and the container according to the target hardware information.

In an embodiment, the processor 1002 is further configured to perform validity verification on the license image layer update request, and generate, according to the license image layer update request, the updated license image layer that includes the target hardware information and the target tenant information when the validity verification succeeds.

In an embodiment, the target tenant information includes an updated container function request list, and the processor 1002 is further configured to detect whether the preset container function list includes the updated container function request list, and perform the step of generating, according to the license image layer update request, the updated license image layer that comprises the target hardware information and the target tenant information when the container function list includes the updated container function request list.

Figure 6:
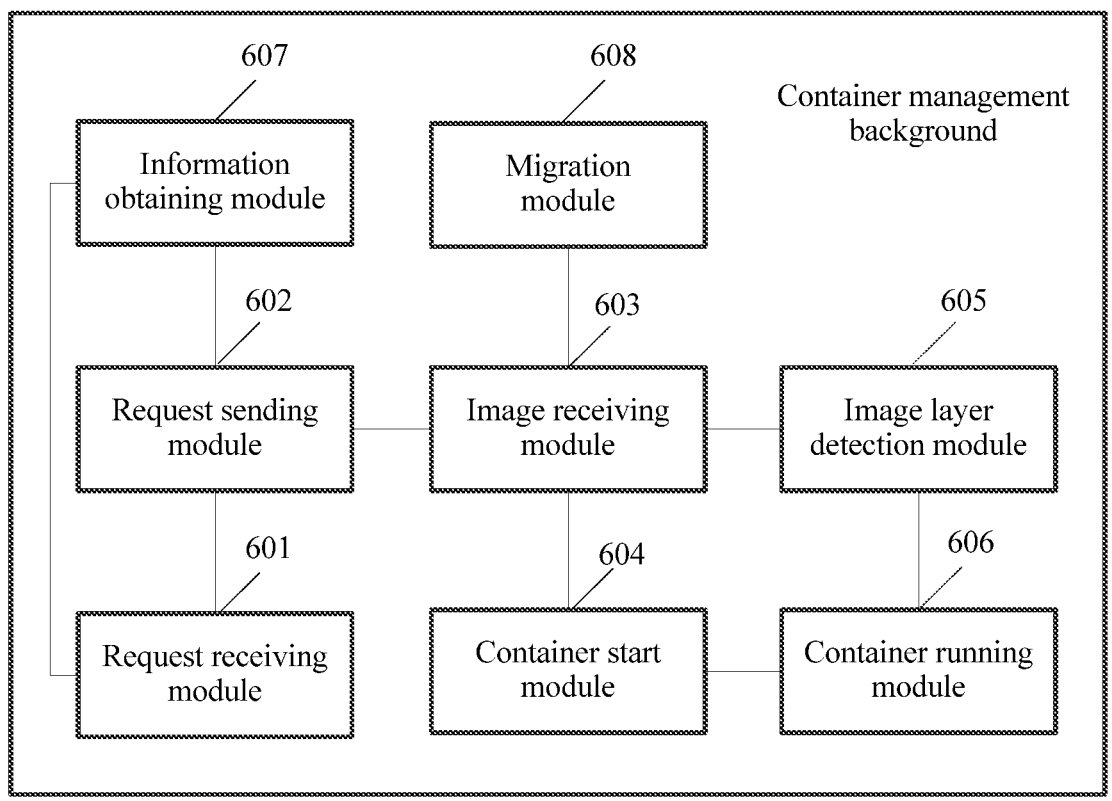
FIG. 6 illustrates a schematic structural diagram of a container management background according to an embodiment of the present disclosure.

Based on a network architecture shown in FIG. 1, referring to FIG. 6, FIG. 6 illustrates a schematic structural diagram of a container management background according to an embodiment of the present disclosure. As shown in FIG. 6, the container management background may include a request receiving module 601 configured to receive a container creation request, a request sending module 602 configured to send an image download request corresponding to the container creation request to an image repository, where the image download request includes information for requesting a license such that the image repository obtains an image according to the image download request, obtains the information for requesting a license that is in the image download request, generates a license image layer corresponding to the information for requesting a license, and adds the license image layer to the image, an image receiving module 603 configured to receive the image to which the license image layer is added and that is sent by the image repository, a container start module 604 configured to start a container corresponding to the image, an image layer detection module 605 configured to detect whether the license image layer is valid, and a container running module 606 configured to run the container when the license image layer is valid.

In a possible implementation, the information for requesting a license includes tenant information and a hardware information list, the license image layer includes the tenant information and the hardware information list, and the image layer detection module 605 is further configured to obtain the hardware information list in the license image layer, obtain local-hardware information of the container, detect whether the hardware information list includes the local-hardware information, and perform the step of running the container when the hardware information list includes the local-hardware information.

In a possible implementation, the request receiving module 601 is further configured to receive a container migration request that includes target hardware information and target tenant information and that is sent by a management control node.

As shown in FIG. 6, the container management background further includes an information obtaining module 607 configured to obtain the target hardware information and the target tenant information in the container migration request.

The request sending module 602 is further configured to send, to the image repository, a license image layer update request that includes the target hardware information and the target tenant information such that the image repository obtains the target hardware information and the target tenant information, performs validity verification on the license image layer update request, and generates and sends an updated license image layer that includes the target hardware information and the target tenant information corresponding to the license image layer update request.

The image receiving module 603 is further configured to receive the updated license image layer sent by the image repository.

As shown in FIG. 6, the container management background further includes a migration module 608 configured to migrate the updated license image layer and the container to a target host corresponding to the target hardware information.

Figure 7:
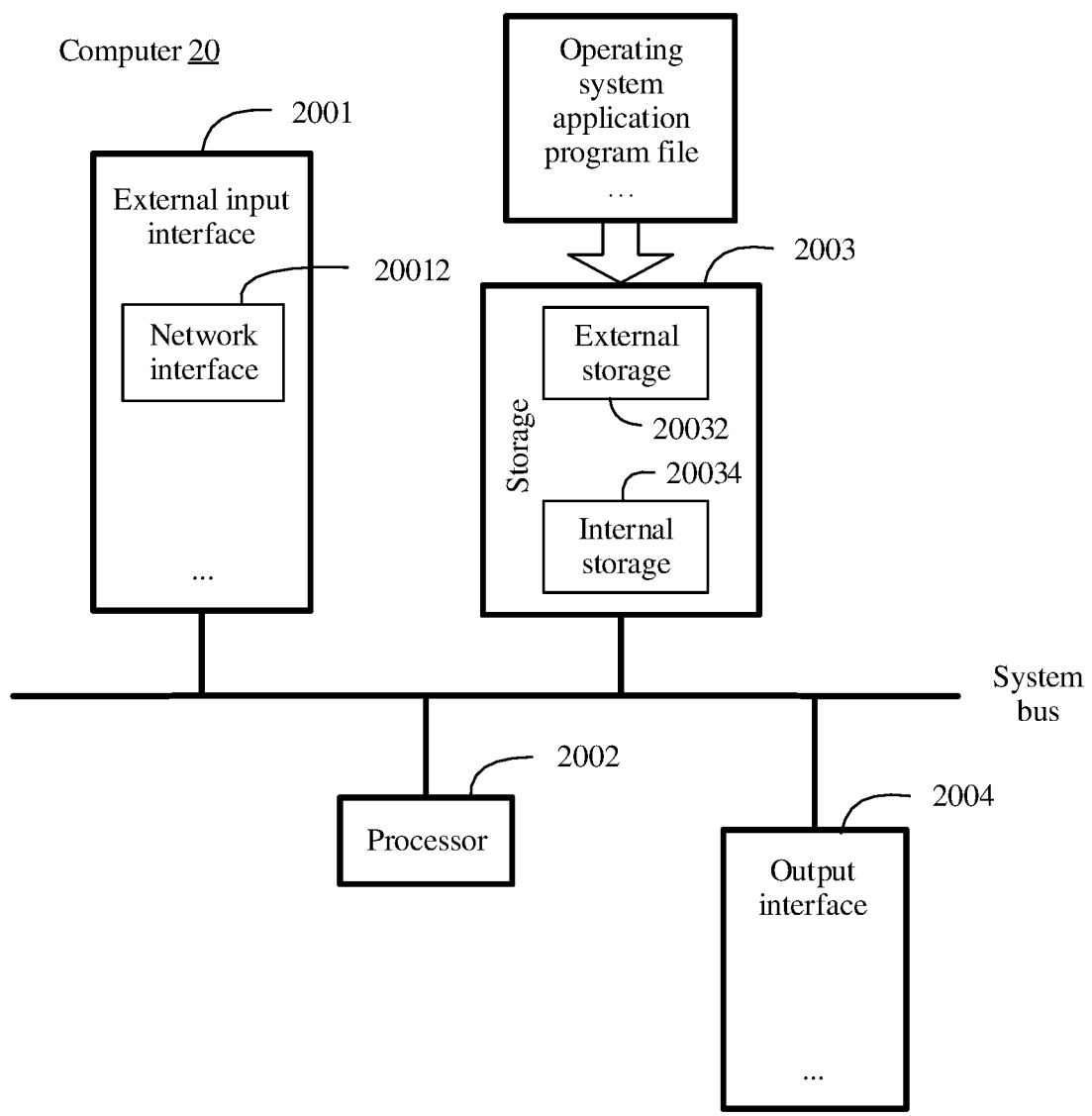
FIG. 7 illustrates another computer that runs a container license management method according to an embodiment of the present disclosure.

Based on a network architecture shown in FIG. 1, referring to FIG. 7, FIG. 7 illustrates another computer 20 that runs the foregoing container license management method according to an embodiment of the present disclosure. As shown in FIG. 7, the computer 20 may include an external input interface 2001, a processor 2002, a storage 2003, and an output interface 2004 that are connected using a system bus. Optionally, the external input interface 2001 may include at least a network interface 20012. The storage 2003 may include an external storage 20032 (such as a hard disk, an optical disc, or a FLOPPY DISK) and an internal storage 20034.

In this embodiment, the method is executed based on a computer program. A program file of the computer program (i.e., operating system application program file) is stored in the external storage 20032 of the computer 20, is loaded into the internal storage 20034 during running, and then is transmitted to the processor 2002 for execution such that the request receiving module 601, the request sending module 602, the image receiving module 603, the container start module 604, the image layer detection module 605, and the container running module 606 shown in FIG. 6 are logically formed on the computer 20. In addition, in a process of executing the foregoing container license management method, an input parameter is received using the external input interface 2001, is transmitted to the storage 2003 for temporarily storage, and then is input into the processor 2002 for processing. A result data of the processing is temporarily stored in the storage 2003 for subsequent processing, or is transmitted to the output interface 2004 for output.

Further, the processor 2002 is configured to perform the steps of receiving a container creation request, sending an image download request corresponding to the container creation request to an image repository, where the image download request includes information for requesting a license such that the image repository obtains an image according to the image download request, obtains the information for requesting a license that is in the image download request, generates a license image layer corresponding to the information for requesting a license, and adds the license image layer to the image, receiving the image to which the license image layer is added and that is sent by the image repository, starting a container corresponding to the image, detecting whether the license image layer is valid, and running the container when the license image layer is valid.

In an embodiment, the information for requesting a license includes tenant information and a hardware information list, the license image layer includes the tenant information and the hardware information list, and the processor 2002 is further configured to obtain the hardware information list in the license image layer, obtain local-hardware information of the container, detect whether the hardware information list includes the local-hardware information, and perform the step of running the container when the hardware information list includes the local-hardware information.

In an embodiment, the processor 2002 is further configured to receive a container migration request that includes target hardware information and target tenant information and that is sent by a management control node, obtain the target hardware information and the target tenant information in the container migration request, send, to the image repository, a license image layer update request that includes the target hardware information and the target tenant information such that the image repository obtains the target hardware information and the target tenant information, performs validity verification on the license image layer update request, and generates and sends an updated license image layer that includes the target hardware information and the target tenant information corresponding to the license image layer update request, receive the updated license image layer sent by the image repository, and migrate the updated license image layer and the container to a target host corresponding to the target hardware information.

All or some of the foregoing embodiments may be implemented by means of software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

What is claimed is:

1. A container license management method, comprising:
   receiving an image download request comprising information for requesting a license from a container management background, wherein the information for requesting the license comprises tenant information;
   obtaining an image according to the image download request;
   obtaining the information for requesting the license in the image download request;
   performing validity verification on the information for requesting the license;
   generating a license image layer corresponding to the information for requesting the license when the validity verification on the information for requesting the license succeeds;
   adding the license image layer to the image; and
   sending, to the container management background, the image to which the license image layer is added.

2. The method of claim 1, wherein the tenant information comprises one or more of tenant identification information or a tenant name required for use of the image.

3. The method of claim 1, wherein the tenant information comprises a container function request list, and wherein performing validity verification comprises:
   detecting whether a preset container function list comprises the container function request list; and
   generating the license image layer when the preset container function list comprises the container function request list.

4. The method of claim 3, further comprising:
   receiving a license image layer update request comprising target hardware information and target tenant information from the container management background;
   obtaining the target hardware information and the target tenant information in the license image layer update request;
   generating an updated license image layer comprising the target hardware information and the target tenant information corresponding to the license image layer update request; and
   sending the updated license image layer to the container management background.

5. The method of claim 4, wherein generating the updated license image layer comprises:
   performing the validity verification on the license image layer update request; and
   generating, according to the license image layer update request, the updated license image layer comprising the target hardware information and the target tenant information when the validity verification succeeds.

6. The method of claim 5, wherein the target tenant information comprises an updated container function request list, and wherein performing the validity verification on the license image layer update request comprises:
   detecting whether the preset container function list comprises the updated container function request list; and
   generating, according to the license image layer update request, the updated license image layer comprising the target hardware information and the target tenant information when the preset container function list comprises the updated container function request list.

7. The method of claim 1, wherein the information for requesting the license further comprises a hardware information list, and wherein generating the license image layer comprises encrypting the tenant information and the hardware information list using a local private key to generate the license image layer, wherein the license image layer comprises the tenant information, the hardware information list, and encryption information generated using the local private key.

8. A container license management method, comprising:
receiving a container creation request;
sending an image download request corresponding to the container creation request to an image repository, wherein the image download request comprises information for requesting a license comprising tenant information and a hardware information list;
receiving an image to which a license image layer is added from the image repository, wherein the license image layer comprises the tenant information and the hardware information list;
starting a container corresponding to the image;
obtaining the hardware information list in the license image layer;
obtaining local-hardware information of the container;
detecting whether the hardware information list comprises the local-hardware information; and
running the container when the hardware information list comprises the local-hardware information.

9. The method of claim 8, further comprising:
receiving a container migration request comprising target hardware information and target tenant information from a management control node;
obtaining the target hardware information and the target tenant information in the container migration request;
sending, to the image repository, a license image layer update request comprising the target hardware information and the target tenant information;
receiving an updated license image layer from the image repository; and
migrating the updated license image layer and the container to a target host corresponding to the target hardware information.

10. An image repository, comprising:
a memory configured to store program instructions; and
a processor coupled to the memory, wherein the program instructions, when executed by the processor, cause the processor to:
receive an image download request comprising information for requesting a license from a container management background, wherein the information for requesting the license comprises tenant information;
obtain an image according to the image download request;
obtain the information for requesting the license in the image download request;
perform validity verification on the information for requesting the license;
generate a license image layer corresponding to the information for requesting the license when the validity verification on the information for requesting the license succeeds;
add the license image layer to the image; and
send, to the container management background, the image to which the license image layer is added.

11. The image repository of claim 10, wherein the tenant information comprises one or more of tenant identification information or a tenant name required for use of the image.

12. The image repository of claim 10, wherein the tenant information comprises a container function request list, and wherein the program instructions further cause the processor to:
detect whether a preset container function list comprises the container function request list; and
generate the license image layer when the container function list comprises the container function request list.

13. The image repository of claim 12, wherein the program instructions further cause the processor to:
receive a license image layer update request comprising target hardware information and target tenant information from the container management background;
obtain the target hardware information and the target tenant information in the license image layer update request;
generate an updated license image layer comprising the target hardware information and the target tenant information corresponding to the license image layer update request; and
send the updated license image layer to the container management background.

14. The image repository of claim 13, wherein the program instructions further cause the processor to:
perform the validity verification on the license image layer update request; and
generate, according to the license image layer update request, the updated license image layer comprising the target hardware information and the target tenant information when the validity verification succeeds.

15. The image repository of claim 14, wherein the target tenant information comprises an updated container function request list, and wherein the program instructions further cause the processor to:
detect whether the preset container function list comprises the updated container function request list: and
generate, according to the license image layer update request, the updated license image layer comprising the target hardware information and the target tenant information when the preset container function list comprises the updated container function request list.

16. The image repository according claim 10, wherein the information for requesting the license further comprises a hardware information list, wherein the program instructions further cause the processor to encrypt the tenant information and the hardware information list using a local private key to generate the license image layer, and wherein the license image layer comprises the tenant information, the hardware information list, and encryption information generated using the local private key.

17. A container management background, comprising:
a memory configured to store program instructions; and
a processor coupled to the memory, wherein the program instructions, when executed by the processor, cause the processor to:
receive a container creation request;
send an image download request corresponding to the container creation request to an image repository, wherein the image download request comprises information for requesting a license comprises tenant information and a hardware information list;

receive an image to which a license image layer is added from the image repository, wherein the license image layer comprises the tenant information and the hardware information list;
start a container corresponding to the image;
obtain the hardware information list in the license image layer;
obtain local-hardware information of the container;
detect whether the hardware information list comprises the local-harddware information; and
run the container when the hardware information list comprises the local-hardware information.

18. The container management background of claim 17, wherein the program instructions further cause the processor to be configured to:
receive a container migration request comprising target hardware information and target tenant information from a management control node;
obtain the target hardware information and the target tenant information in the container migration request;
send, to the image repository, a license image layer update request comprising the target hardware information and the target tenant information;
receive an updated license image layer from the image repository; and
migrate the updated license image layer and the container to a target host corresponding to the target hardware information.

\* \* \* \* \*